United States Patent [19]

Nakade et al.

[11] Patent Number: 4,847,751
[45] Date of Patent: Jul. 11, 1989

[54] MULTI-TASK EXECUTION CONTROL SYSTEM

[75] Inventors: Toshimitsu Nakade, Nabari; Masaru Kuki, Osaka; Takaaki Uno, Nara, all of Japan

[73] Assignee: Sharp Kabushiki Kaisha, Osaka, Japan

[21] Appl. No.: 59,192

[22] Filed: Jun. 8, 1987

Related U.S. Application Data

[63] Continuation of Ser. No. 634,422, Jul. 26, 1984, abandoned.

[30] Foreign Application Priority Data

Jul. 29, 1983 [JP] Japan ................... 58-140751

[51] Int. Cl.[4] .......................... G06F 9/38; G06F 9/46
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,158,317 | 11/1964 | Alexander | 364/200 |
| 3,187,321 | 6/1965 | Kamey | 364/200 |
| 3,533,076 | 10/1967 | Perkins et al. | 364/200 |
| 4,152,761 | 5/1979 | Louie | 364/200 |
| 4,384,324 | 5/1983 | Kim et al. | 364/200 |
| 4,493,020 | 1/1985 | Kim et al. | 364/200 |
| 4,543,630 | 9/1985 | Neches | 364/200 |
| 4,553,202 | 11/1985 | Trufyn | 364/200 |
| 4,591,976 | 5/1986 | Webber et al. | 364/200 |
| 4,604,694 | 8/1986 | Hough | 364/200 |

Primary Examiner—Gary V. Harkcom
Assistant Examiner—Christopher H. Lynt
Attorney, Agent, or Firm—Birch, Stewart, Kolasch, & Birch

[57] ABSTRACT

In a microcomputer system, having independently programmed tasks and a master control processing unit (CPU), tasks can be switched independent of the master CPU through the use of a multi-task support processor which may, for example, be connected to the microcomputer system via an input/output (I/O) port. The multi-task support processor includes a memory for storing task control programs, a data memory and task control memory, a timer, a controller for controlling multi-task operations, and a master CPU interface element. Tasks including task control commands are stored in a memory for execution by the master CPU. The master CPU, upon encountering a task control command, sends that command to the multi-task support processor which becomes activated to control the switching and communications between the tasks under the direction of the received task control command, so that tasking control may be performed independent of the master CPU.

5 Claims, 2 Drawing Sheets

MULTI-TASK EXECUTION CONTROL SYSTEM

This application is a continuation of application Ser. No. 634,422 filed on July 26, 1984, now abandoned.

BACKGROUND OF THE INVENTION

The present invention relates to a method of controlling the execution of multiple tasks in a microcomputer system.

Conventionally, when a CPU unit simultaneously executes a plurality of tasks in a microcomputer system, each program is obliged to deal with complex and massive contents. In addition, timing mechanisms needed for the task switching operation cannot be designed easily. To compensate for this, a microcomputer system uses the operating system (OS) to properly control the execution of multiple tasks. In other words, the microcomputer system is obliged to perform the switching operation (OS) for correctly executing a plurality of tasks. Conventionally, either a floppy disk or ROM containing the software operation system is made available for controlling the execution of multiple tasks. However, since such a software operating system is provided in a position above the program memory space controlled by the master CPU, the master CPU itself must execute the task switching operation, thus eventually restraining the user's program addresses to some extent. Although the concept of task control is basically free from the architecture of the CPU, if the task control is built into the operating system, the task control operation will become largely dependent on the CPU. As a result, if the needed operating system software is transferred to another CPU, it becomes necessary to also convert the operating system software so that it can be suited for use in the designated CPU, thus requiring an excessive handling operation to implement the needed conversion.

OBJECT AND SUMMARY OF THE INVENTION

The present invention aims at providing a method of controlling the execution of multiple tasks, being perfectly compatible with any CPU of a microcomputer system, since the preferred embodiment effectively switches tasks independent of the master CPU without applying any restraint on memory space availability and also without depending on the architecture of the CPU.

The preferred embodiment of the present invention provides a method of controlling the execution of multiple tasks comprising means for controlling the execution of multiple tasks by first entering a plurality of tasks into programs before these tasks are executed by the main CPU, followed by reception of a specific command by a multi-task support processor located external of the master CPU which activates switching and communication between tasks so that the switching and communication between the multiple tasks can be controlled by the command.

Although there are several methods employed for controlling the execution of multiple tasks, the preferred embodiment of the present invention is definitely unique, since the control of the execution of multiple tasks is assigned to the independently operating processes. The preferred embodiment can be usefully applied to a variety of microcomputer systems and effectively improves the operational efficiency.

DETAILED DESCRIPTION OF THE INVENTION

Figure 1:
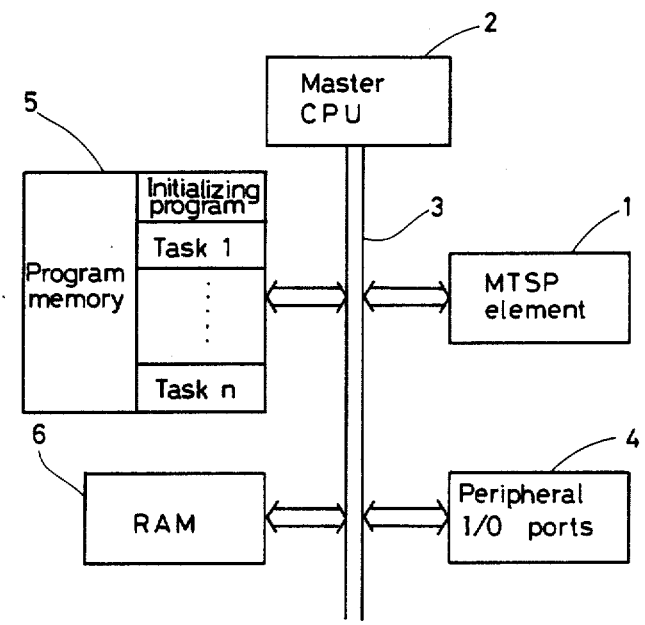
FIG. 1 shows a simplified block diagram of a multi-task execution control system incorporating the preferred embodiment of the present invention.

In reference to the attached drawings, the preferred embodiment of the present invention is described below. FIG. 1 shows a simplified block diagram of a multi-task execution control system embodied by the present invention. Reference number 1 indicates the main elements making up an independent multi-task support processor (hereinafter called MTSP element) that controls the execution of multiple tasks by switching a number of tasks in the microcomputer system. Like other peripheral devices, the MTSP element 1 is provided at one of the I/O ports. Also, like the other peripheral input terminal 4, the MTSP element 1 is connected to a master CPU 2 via an internal bus 3. Program memory 5 independently stores the initialized programs of the MTSP element 1 and a plurality of tasks, while the program memory 5 is connected to a data memory RAM 6 which is to be used by respective tasks, thus making up a system. The MTSP element 1 executes the scheduling of tasks in order to realize the multi-task system (by performing the switching of tasks to be executed according to the precedence of the time-sharing), while it also executes the synchronization and communication between tasks (by either transmitting or receiving data between tasks and by determining whether the task execution should be discontinued or resumed). The MTSP element 1 is provided with a function to control memory (by inhibiting the duplicated use of the memory area available for each task) and a clock function as well. In other words, the MTSP element 1 removes the necessity for performing the multi-task control function as a function of the operating system of the computer system, by acting as a peripheral device which itself executes the multiple task control function.

Figure 2:
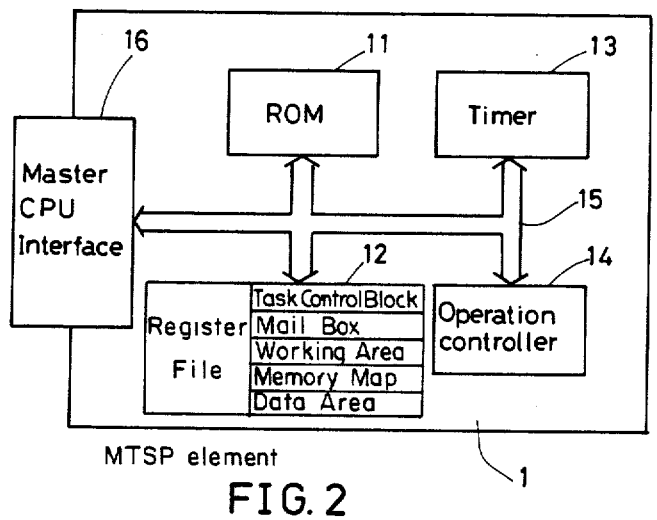
FIG. 2 shows the internal configuration of the main elements of the multi-task execution control system shown in FIG. 1.

FIG. 2 shows the internal configuration of the MTSP element 1. The software that executes multiple tasking control, contained in the MTSP element 1 is stored in a ROM of a program memory 11. Register file 12 provides the data memory necessary for executing the function of the MTSP element 1 and contains a task control block (which is the area in which information needed for switching tasks is registered), a mail box (which is the relay point for data used to synchronize and communicate between tasks), a memory map (which is the area that registers data needed for controlling memory and indentifying whether the memory area is busy or not), a working area, and an exclusive data area, respectively. A timer 13 executes the time-sharing process (which causes tasks holding the same precedence to be executed at specific intervals) and a clock function as well. An operation controller 14, containing an ALU and other arithmetic units, executes programs stored in the program memory 11, which is connected to other units via an internal bus 15. In addition, the MTSP element 1 is also provided with a master CPU interface 16 for executing data input and output to and from the master CPU 2 and for realizing the interruption into the master CPU 2. Access from the master CPU 2 to the MTSP element 1 is executed by an activated command, whereas access from the MTSP element 1 to the master CPU 2 is executed by an interruption. The MTSP element 1 has a basic specification, for example, as shown below.

| Items | Specifications |
| --- | --- |
| Tasks to be registered: | 8 max.Task numbers 1 through 8 |
| Priority level: | 8 max. Priority: 1 through 8 |
| Mail box: | 8 max. Mail box numbers 1 through 8 |
| Clock unit: | 10 microseconds |
| Scheduling: | Either by the precedence or by the time-sharing. Switches tasks by applying an interruption from the MTSP element 1. |
| Number of commands: | 14 commands |
| Task registration: | When the system is activated, task information is registered into the MTSP element 1. |
| Memory control: | When the system is activated, the initial and last RAM addresses available for users are registered into the MTSP element 1. Control of the MTSP element 1: Any desired address can be chosen from addresses 0 through FFFFH at 100H intervals. |
| Clock: | Clock sets hour, minute, and second, which can be read as required. |

Figure 3:
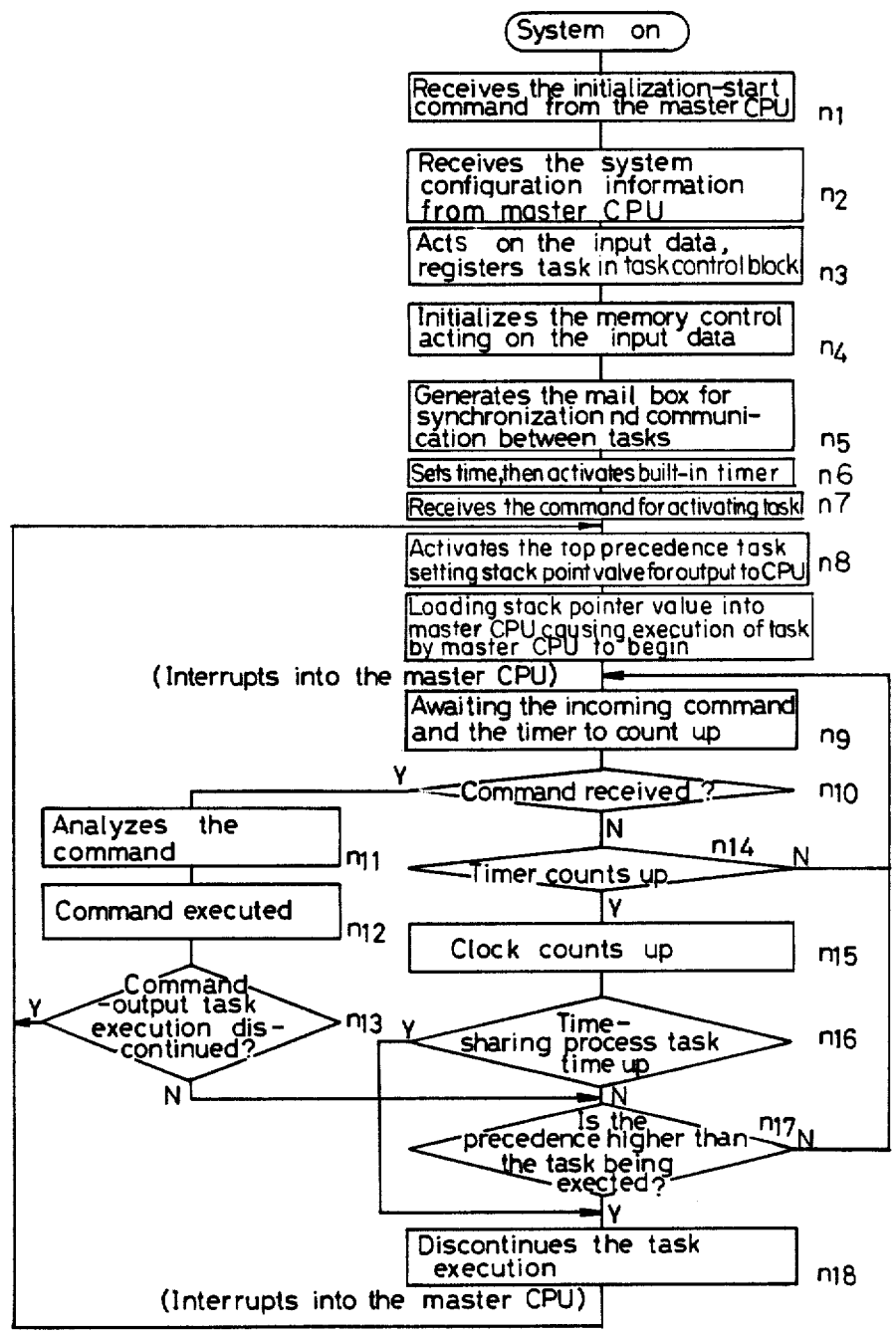
FIG. 3 shows the flowchart describing the stepwise operations of the main elements shown in FIG. 2.

FIG. 3 shows the flowchart describing the execution of the multi-task control performed by the MTSP element 1. In reference to this flowchart, details of the multi-task control operation are described below.

When the system is activated by turning the power on, the master CPU 2 sends the initialization start command which is to be delivered to the MTSP element 1 (step n1). When the master CPU 2 outputs the initialization start command, the MTSP element 1 accepts the system configuration information from the master CPU 2 (step n2). On receipt of this information, the MTSP element 1 then registers an information needed for switching tasks into respective task control blocks (step n3). This allows those tasks to enter the executable status so that they can order themselves according to precedence. To initialize the memory control, the MTSP element 1 first sets the available RAM area to be used for the system (step n4). Next, the mail box available for synchronization and communication between tasks is generated (step n5). The MTSP element 1 then sets the time in the built-in timer before the timer is activated (step n6). Finally, the MTSP element 1 accepts the command for activating the desginated tasks (step n7).

The initialization command, the system configuration information, and the task activation command, are previously stored in the initialization program of the program memory shown in FIG. 1. The initialization program can be replaced according to the contents of the designated tasks. The MTSP element 1 thus sets a variety of initial data.

As soon as the master CPU 2 sends out the task activation command which is the last output from the intialization program (step n7), the task having top precedence is ready to be executed (step n8). In other words, the MTSP element 1 selects the top precedence task from all the executable tasks, and then loads the stack pointer value of the registered task into the bus register for output to the CPU. After the stack pointer value has been loaded, the MTSP element 1 generates an interrruption request signal which is sent to the master CPU 2, which then executes the interruption routines. As a result, the stack pointer value set in the MTSP element 1 is loaded into the stack pointer of the CPU 2, which then causes the initial value pre-set in the register to be popped out of the stack before rewriting the register. Finally, the designated task is executed under the control of the master CPU 2.

As soon as the task execution begins, the MTSP element 1 will enter the standby state (step n9) until it receives the activated command from the designated task or until the built-in timer counts up. On receipt of the activated command (step n10), the MTSP element 1 analyzes the command (step n11) and then executes the command (step n12). There are a variety of the input commands, the details of which are described below.

| Names | Functions |
| --- | --- |
| TSPD | Stops the task execution to eliminate the task from the control of the MTSP element 1. |
| TRSM | Activates the task execution from either the standby or stop mode. |
| TPRI | Changes the priority of the tasks to be executed. |
| TSLI | Designates the time-sharing process. |
| TIMR | Designates the timer operation for setting the time-out time or for keeping the timer to stand by for a specific period of time. |
| CSET | Sets the clock. |
| CGET | Reads the clock. |
| MALC | Monopolizes memory. |
| MREL | Releases memory. |
| POST | Transmits messages. |
| PEND | Receives messages. Keeps standby until receiving any message. |

A specific command that discontinues (by activating either the standby or stop mode) the execution of a task during the command execution (step n12) switches the tasks to be executed.

For example, when the command TSPD is output from the task program being executed, step n13 is executed so that the execution of the designated task can be discontinued. This brings the MTSP operation back to step n8 where an interruption is activated to allow the executable task having top precedence to be executed. When step n12 is entered, the task that sent out the command will release itself from the executable state, and then the task will be free from the control of the MTSP element 1. The command TRSM output from the designated task permits the task to resume the executable state.

The command POST that permits the task execution to run can discontinue (step n18) the task execution by applying an interruption to the master CPU 2 only when the executable task in the next turn has higher precedence than the task being executed (step n17), and as a result, the MTSP element 1 can switch to the next executable task (step n8). In other words, if a task, having higher precedence that the task that sent out the command POST, is in the standby mode activated by the command PEND, the MTSP element 1 will switch the command POST-activated task with the standby task for execution.

When the built-in timer 13 counts up (step n14), the MTSP element 1 causes the clock to also count up (step n15). When the MTSP element 1 executes the command and the designated time has elapsed (step n16), the MTSP element 1 activates an interruption into the master CPU 2 so that task execution can be discontinued (step n18) and the next executable task having the same precedence assigned by time-sharing will be eventually executed (step n8). The time-sharing process is designated by the entry of the command TSLI. Process requirements, for example, the registration of the time-sharing task (procedure) and the designated time-sharing time can be simultaneously executed after receiving the command TSLI.

During the time-sharing operation, if the designated time has not yet elapsed, the task under execution can check to see if any of other executable tasks has higher precedence (step n17). Therefore, if a task is standing by to receive a message in response to any command activated, for example, the command PEND, the MTSP element 1 will switch the task under execution to the one standing by so that it can receive the needed data (steps n18 and n8). Conversely, if there is no task having higher precedence, the MTSP element 1 will wait for commands and timer count-up (step n9).

As described above, the preferred embodiment of the present invention has made it possible to switch tasks as required independent of the master CPU 2. Since no restraint is applied to the memory space and all switching operations can be executed without depending on the CPU architecture, the preferred embodiment can be applied to all kinds of CPUs in microcomputer systems. In addition, if the MTSP element 1 is made available independently, multiple tasks can be easily controlled by merely connecting the MTSP to any CPU microcomputer in the same way that other peripheral devices are connected.

What is claimed is:

1. A multi-task execution control system for a microcomputer having only a single central processor unit comprising:
    memory means for storing a plurality of independently programmed tasks, said plurality of independently programmed tasks including a plurality of task control commands;
    said single central processor unit (CPU) executing said plurality of tasks; and
    multi-task support processor means, external from and operatively connected to said central processor means and responsive to said task control commands, for controlling the switching and communication of said plurality of tasks for execution by said central processing unit;
    said central processor unit, upon execution of an activation task control command included in an independently programmed task, sending said activation task control command to said multi-task support processor means;
    said multi-task support processor means controlling the switching of and the communication between said plurality of tasks under the direction of said activation task control command independently of the architecture of said central processor unit.

2. A system, as recited in claim 1, wherein said multi-task support processor means includes,
    first memory means for storing control programs for controlling the switching and communication between said plurality of tasks,
    interface-means, operatively connected to said central processor unit for sending data to and receiving data from said central processor means,
    second memory means, connected to said interface means for storing system configuration data received from said central processing unit, and
    control means, responsive to said control programs and said task control command received from said central processor unit, for controlling the switching and communication between said plurality of tasks.

3. A system, as recited in claim 2, wherein said second memory means stores priority data corresponding to said plurality of tasks, and
    said control means controls the switching between said plurality of tasks in accordance with said priority data.

4. A system, as recited in claim 2, further comprising, input/output means, external from and operatively connected to said central processor means, for inputting data to said central processor unit from an external device and outputting data from said central processor means to said external device.

5. A system, as recited in claim 2, wherein said control means initiates switching between said plurality of tasks by causing said interface means to receive or transmit said plurality of tasks to said central processor unit.

* * * * *